(12) United States Patent
Zummo et al.

(10) Patent No.: US 8,219,138 B2
(45) Date of Patent: Jul. 10, 2012

(54) OPTIMAL POWER ALLOCATION METHOD FOR AN LSSTC WIRELESS TRANSMISSION SYSTEM

(75) Inventors: Salam Adel Zummo, Dhahran (SA);
Ahmad Suhail Salim, Dhahran (SA);
Samir Nasser Al-Ghadban, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 205 days.

(21) Appl. No.: 12/805,219

(22) Filed: Jul. 19, 2010

(65) Prior Publication Data

US 2012/0014462 A1    Jan. 19, 2012

(51) Int. Cl.
*H04B 7/00* (2006.01)
(52) U.S. Cl. ........... 455/522; 455/69; 375/260; 375/295
(58) Field of Classification Search .................. 455/69, 455/522; 375/219, 260, 267, 285, 295
See application file for complete search history.

(56) References Cited

U.S. PATENT DOCUMENTS

| | | | |
|---|---|---|---|
| 7,627,347 B2 | 12/2009 | Codreanu et al. | |
| 7,953,176 B2 * | 5/2011 | Roh | 375/295 |
| 2006/0098754 A1 * | 5/2006 | Kim et al. | 375/267 |
| 2008/0080634 A1 | 4/2008 | Kotecha et al. | |
| 2009/0128410 A1 | 5/2009 | Li | |
| 2009/0304103 A1 | 12/2009 | Vaidyanathan et al. | |
| 2010/0067600 A1 | 3/2010 | Kim et al. | |

OTHER PUBLICATIONS

El-Hajjar et al. Layered Steered Space-TimeCodes Using Iterative Detection, School of Electronics and Computer Science, Univ. of Southampton, SO17 1BJ, UK.*
Wolniansky et al., "V-BLAST: An Architecture for Realizing Very High Data Rates Over the Rich-Scattering Wireless Channel", Proc. ISSSE-98, URSI International Symposium (1998), pp. 295-300.

* cited by examiner

*Primary Examiner* — Nay A Maung
*Assistant Examiner* — Chung-Tien Yang
(74) *Attorney, Agent, or Firm* — Richard C. Litman

(57) ABSTRACT

The optimal power allocation method for an LSSTC wireless transmission system utilizes Layered Steered Space-Time Codes (LSSTC), a recently proposed multiple-input multiple-output (MIMO) system that combines the benefits of vertical Bell Labs space-time (V-BLAST) scheme, space-time block codes (STBC), and beamforming. A new downlink scheme employs LSSTC with optimal power allocation based on the assumption that the user feeds the base station (BS) with the average signal-to-noise ratio (SNR) per V-BLAST layer through the uplink feedback channel. Such a system enhances the error performance by assigning power to the layers in an optimum manner.

6 Claims, 3 Drawing Sheets

OPTIMAL POWER ALLOCATION METHOD FOR AN LSSTC WIRELESS TRANSMISSION SYSTEM

BACKGROUND OF THE INVENTION

1. Field of the Invention

The present invention relates data transmission methods in a multiple-input, multiple-output (MIMO) wireless transmission system, and particularly to an optimal power allocation method for layered-steered space-time coded (LSSTC) wireless transmissions.

2. Description of the Related Art

Various techniques have been proposed to counter the problem of propagation conditions and to achieve data rates that are very close to the Shannon limit. One of these techniques employs MIMO systems, which use antenna arrays at both the transmitter and the receiver. Wolniansky et al. have proposed the well-known MIMO scheme known as V-BLAST (see "V-BLAST: An Architecture for Realizing Very High Data Rates Over the Rich-Scattering Wireless Channel", Proc. ISSSE-98, URSI International Symposium (1998), pp. 295-300). In V-BLAST, parallel data streams are sent via the transmit antennas at the same carrier frequency. V-BLAST can achieve high spectral efficiencies without increasing the system's bandwidth or transmitted power. While MIMO systems, such as V-BLAST, can improve the system capacity greatly, it is difficult to implement antenna arrays on handheld terminals due to size, cost and hardware limitation. Moreover, V-BLAST has poor energy performance and doesn't fully exploit the available diversity. In order to overcome these problems, space-time block code (STBC) was developed. STBC has two transmit and one receive antennas that provides the same diversity order as maximal-ratio receiver combining (MRRC) with one transmit and two receive antennas. This scheme can be generalized to two transmit antennas and M receive antennas to provide a diversity order of 2M.

With the tempting advantages of V-BLAST and STBC, many researchers have attempted to combine these two schemes to result in a multilayered architecture called MLSTBC, in which each layer is composed of antennas that correspond to a specific STBC. This combined scheme arises as a solution to jointly achieve spatial multiplexing and diversity gains simultaneously. With the MLSTBC scheme, it is possible to increase the data rate while keeping a satisfactory link quality in terms of symbol error probability (SER). Beamforming has been combined with MLSTBC to produce a hybrid transmission scheme called the layered steered space-time codes (LSSTC). The addition of beamforming to MLSTBC further improves the performance of the system by focusing the energy towards one direction, where the antenna gain is increased in the direction of the desired user while reducing the gain towards the interfering users.

However, the problem of efficient power allocation to ensure a low error rate in an LSSTC system still exists. Thus, an optimal power allocation method for an LSSTC wireless transmission system solving the aforementioned problems is desired.

SUMMARY OF THE INVENTION

The optimal power allocation method for an LSSTC wireless transmission system utilizes Layered Steered Space-Time Codes (LSSTC), a recently proposed multiple-input multiple-output (MIMO) system that combines the benefits of vertical Bell Labs space-time (V-BLAST) scheme, space-time block codes (STBC), and beamforming. A new downlink scheme employs LSSTC with optimal power allocation based on the assumption that the user feeds the base station (BS) with the average signal-to-noise ratio (SNR) per V-BLAST layer through the uplink feedback channel. Such a system enhances error performance by assigning power to the layers in an optimum manner.

The method presents an optimal design for a power allocation algorithm to regulate power to the antenna arrays comprising a LSSTC scheme. The power allocation algorithm utilizes the channel state information feedback from the mobile station on the uplink to the BS, and finds the best power allocation to the channel conditions encountered by the BS. The resulting method provides an LSSTC system with optimal power allocation that enhances the symbol error rate (SER) performance without any further cost, except the feedback of the channel state information and simple calculations at the BS to find the best power allocation scheme.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The optimal power allocation method for an LSSTC wireless transmission system utilizes Layered Steered Space-Time Codes (LSSTC), a recently proposed multiple-input multiple-output (MIMO) system that combines the benefits of vertical Bell Labs space-time (V-BLAST) scheme, space-time block codes (STBC), and beamforming. A new downlink scheme employs LSSTC with optimal power allocation based on the assumption that the user feeds the base station (BS) with the average single-to-noise ratio (SNR) per V-BLAST layer through the uplink feedback channel. Such a system enhances the error performance by assigning power to the layers in an optimum manner. The method provides an optimum power allocation LSSTC (OPA-LSSTC). The technique has been proven to be superior to existing LSSTC systems without power allocation.

Figure 1:
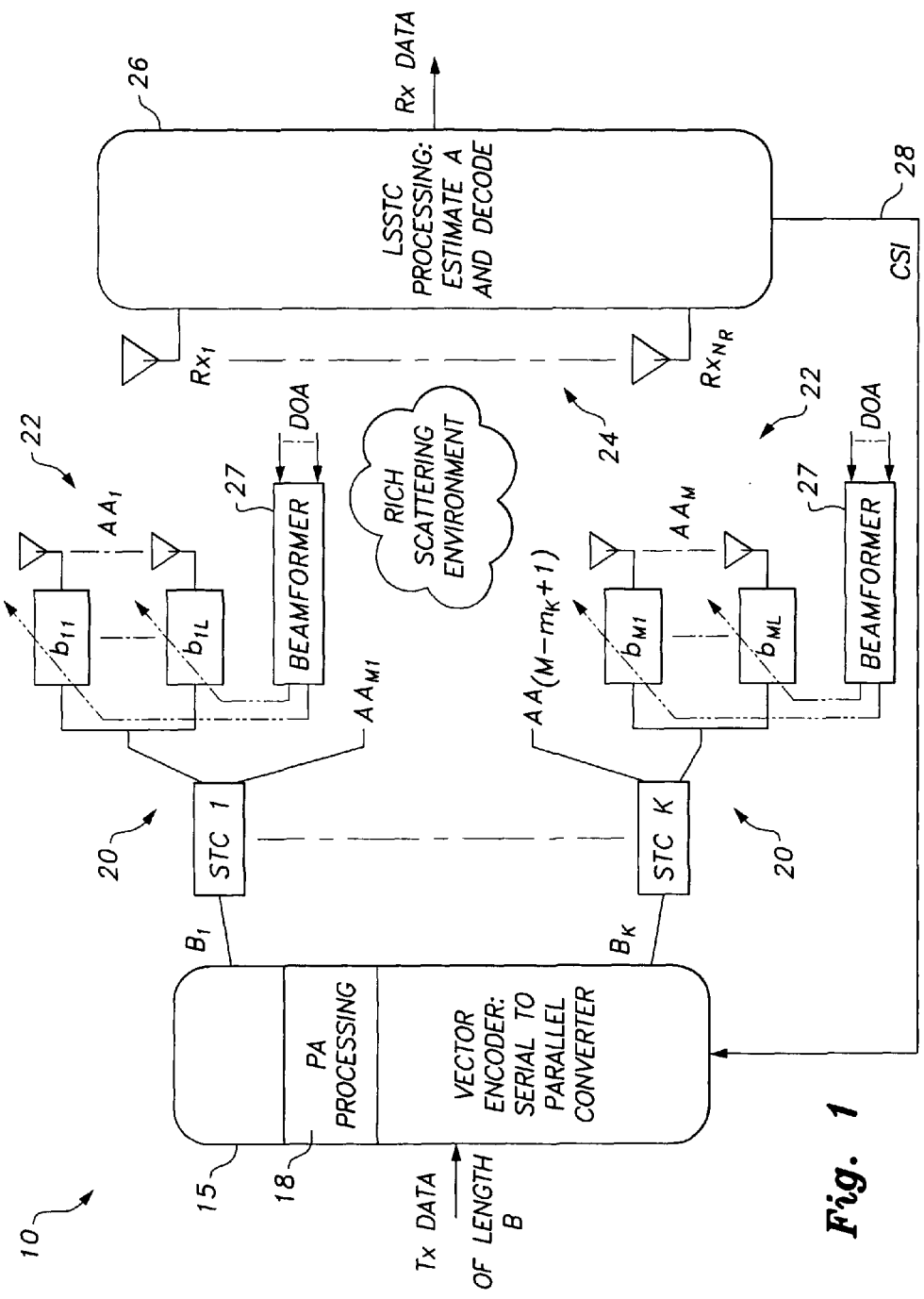
FIG. 1 is a block diagram of a LSSTC wireless transmission system capable of implementing an optimal power allocation method for an LSSTC wireless transmission system according to the present invention.

FIG. 1 shows the block diagram of an exemplary LSSTC system 10 capable of implementing the optimal power allocation method. The system 10 has NT total transmitting antennas 22 and NR receiving antennas 24, and is denoted by an NT×NR system notation. The antenna architecture shown has M transmit adaptive antenna arrays (AA1-AAM) spaced sufficiently far apart in order to experience uncorrelated fading and, hence, achieve transmit diversity. Each of the adaptive antenna arrays AAs consists of L elements that are spaced at a distance of $d=\lambda/2$ to ensure that beamforming can be achieved by beamformers 27. A block of B input information bits is sent to the LSSTC vector encoder 15, and then serial-to-parallel conversion produces K streams (layers) of length $B_1, B_2, \ldots, B_k$, where $B_1+B_2+\ldots+B_k=B$. Each group of $B_k$ bits, $k \in [1, \ldots, K]$, is then encoded by a component space-time encoder 20 STCk associated with $m_k$ transmit AAs, where $m_1+m_2+\ldots+m_k=M$. The output of the $k^{th}$ STC encoder is a $m_k \times I$ codeword, $c_i$, that is sent over I time intervals. The space-time coded symbols from all layers can be written as $C=[c_1, c_2, \ldots, c_K]^T$, where C is an M×I matrix.

The coded symbols from C are then processed by the corresponding beamformers 27, and then transmitted simultaneously over the wireless channel, which is assumed to be incorporated in a rich scattering environment. The transmitted symbols have an average power of $P_T=1$, where the average is taken across all codewords over both spatial and temporal components. For proper operation, $N_R$ should be at least equal to K. The base station 15 (BS) employing the OPA-LSSTC scheme prompts the user (device) 26 to feedback the channel state information (CSI) per layer via the feedback channel 28, along with the direction of arrival (DOA) data. Based on the feedback information from the mobile station 26, the BS 15 performs optimal power allocation (OPA) processing 18 by computing the best power allocation pattern, which is defined in a similar manner as for V-BLAST. The OPA scheme is characterized by the power allocation (PA) vector $K=[K_1, K_2, \ldots, K_{M-1}]$, where $K_i$ is defined as the transmit power ratio of the $i^{th}$ layer to the sum of the power of layers $i+1, \ldots, K$. $K_i$ is defined by:

$$K_i = \frac{P_i}{\sum_{j=i+1}^{K} P_j}, i = 1, 2, \ldots, K-1, \quad (1)$$

where $P_i$ denotes the transmit power of the $i^{th}$ layer.

In order to find the OPA pattern $K_{opt}$, that would result in optimizing the performance and minimizing the probability of error for the LSSTC system, the formula of the average symbol error probability $P_{av|(K,N_0)}$ is differentiated, with respect to the OPA pattern K, resulting in the minimum value of the symbol error probability. Clearly, such analytical differentiation is very difficult. Therefore, $P_{av|(K,N_0)}$ is numerically differentiated by using Newton's method. To minimize $P_{av|(K,N_0)}$, we need to find the value of $K=[K_1, K_2, \ldots, K_{K-1}]$ that satisfies the following set of equations:

$$\frac{\partial P_{av|(K,N_0)}}{\partial K_i} = 0, i = 1, 2, \ldots, K-1, \quad (2).$$

To solve the set of equations by Newton's method, an initial guess of the PA pattern $K^{(0)}=[K_1^{(0)}, K_2^{(0)}, \ldots, K_{K-1}^{(0)}]$ is used. The optimum PA pattern $K_{opt}$ can be obtained by repeating Newton's method until it converges, which depends on the initial guess $K^{(0)}$ and the step size.

Figure 2:
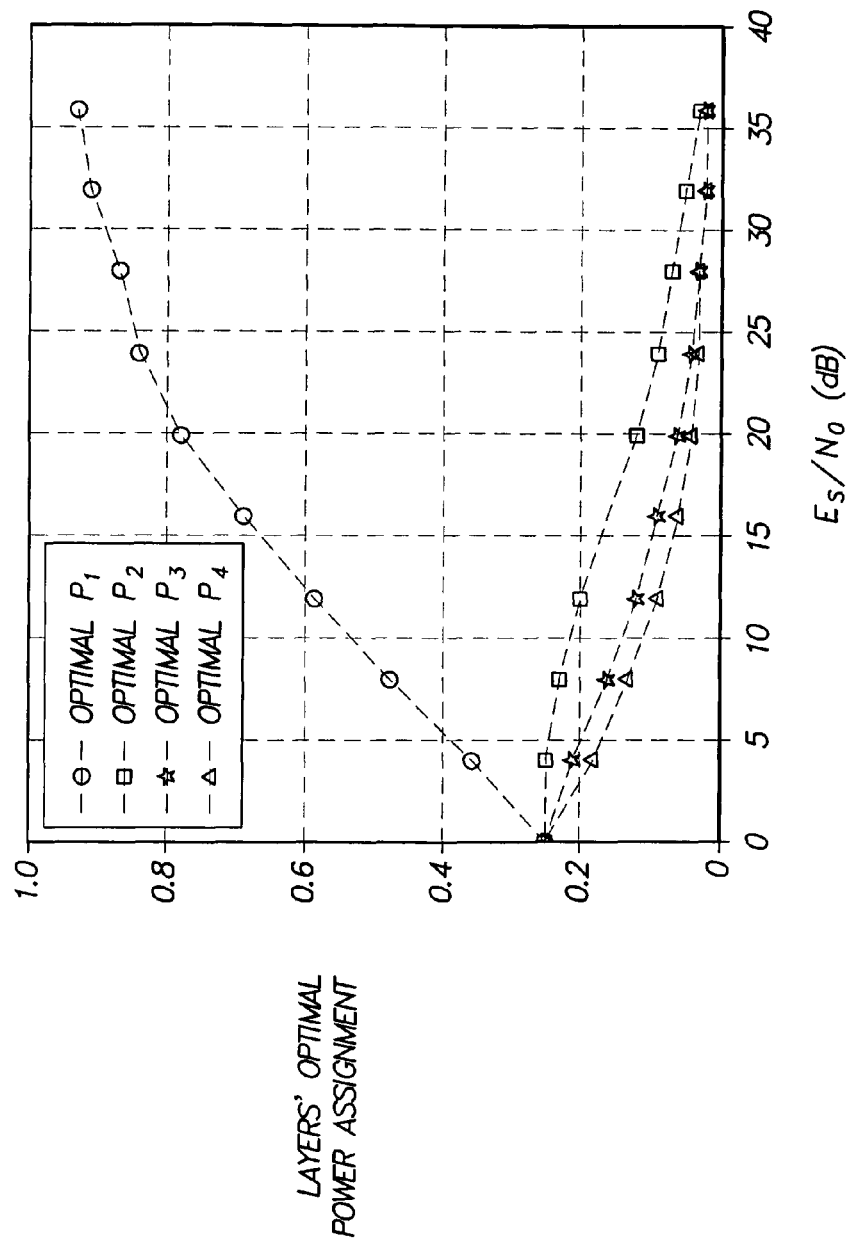
FIG. 2 is a plot for an exemplary 16×4 LSSTC system using binary phase shift keying (BPSK) showing optimal power allocation for each of the four layers vs. the signal-to-noise ratio ($E_S/N_0$) for each layer using an optimal power allocation method for an LSSTC wireless transmission system according to the present invention.
Figure 3:
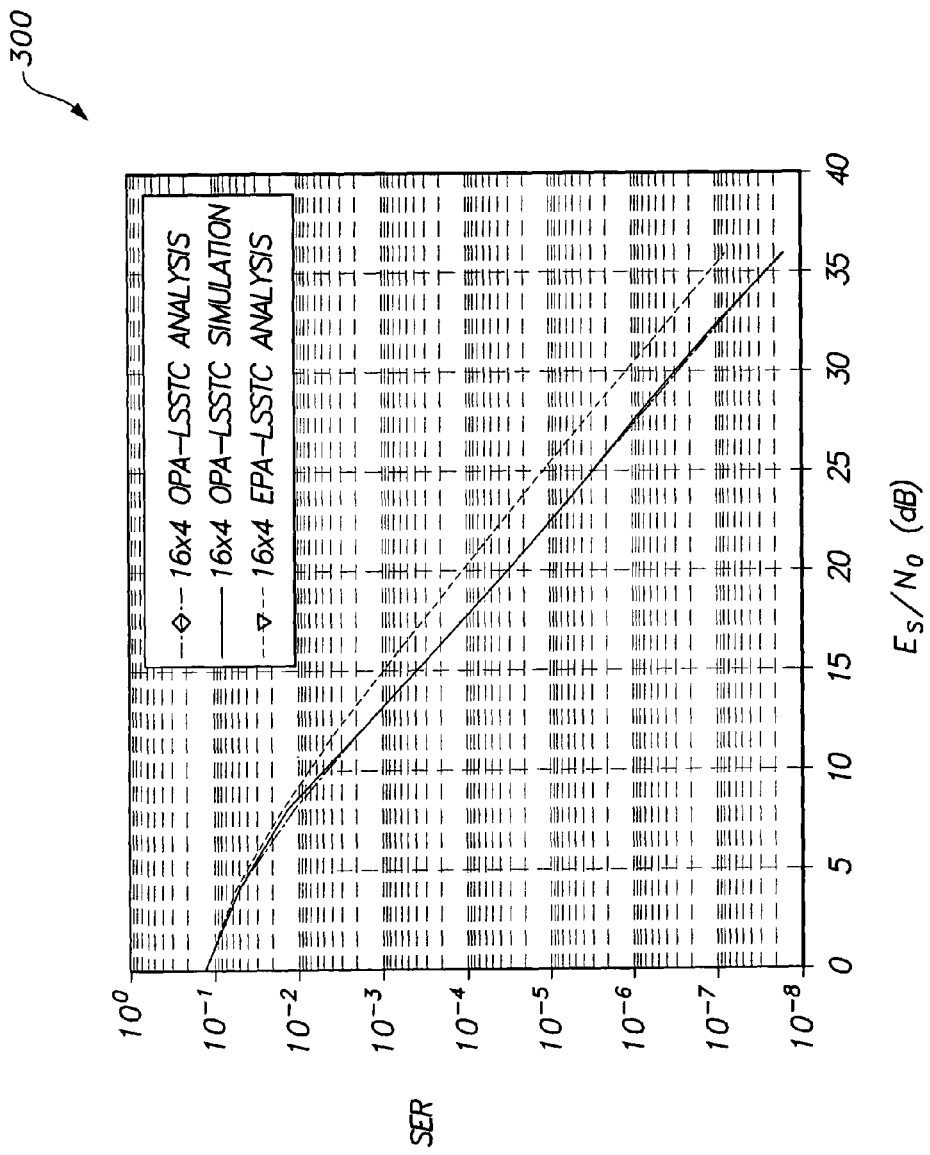
FIG. 3 is a plot for the exemplary 16×4 LSSTC system of FIG. 2 showing symbol error rate (SER) vs. signal-to-noise ratio ($E_S/N_0$) using an optimal power allocation method for an LSSTC wireless transmission system according to the present invention.

A 16×4 OPA-LSSTC employing BPSK modulation with K=4 and L=2 is considered. The optimum PA for each layer versus $E_S/N_0$ is shown in plot 200 of FIG. 2, where it can be seen that at high SNR, the impact of error propagation is more dominant than the noise. It can be seen from FIG. 2 that the symbol error rate (SER) is dominated by the first layer, and that the detection errors in the first layer would cause severe detection errors to the following layers. Therefore, the optimum PA scheme suggests assigning the earlier layers higher power than the later ones as the SNR increases. It is noted that the first layer gets most of the transmit power at high SNR, since it is the weakest layer that has the lowest diversity order among all layers. FIG. 3 shows an SER plot 300 of a 16×4 LSSTC system employing BPSK modulation with K=4 and L=2. Two cases, PA-LSSTC with equal power allocation (EPA-LSSTC) and the OPA-LSSTC, are compared. The symbol error probability analysis is shown to be very accurate as compared to simulation results. It is observed that the proposed OPA-LSSTC has about 2.5 dB gain at an SER of $10^{-4}$ compared to EPA-LSSTC. This shows the superior performance of the proposed method.

The power allocation method can be seamlessly added at very low cost to existing and evolving wireless communication systems employing MIMO, such as the long-term evolution (LTE) or WiMAX systems, because the method only requires running the OPA processing algorithm on existing hardware.

It will be understood that the diagrams in the Figures depicting the optimal power allocation method are exemplary only. A system implementing the method may be embodied in a dedicated electronic device having a microprocessor, microcontroller, digital signal processor, application specific integrated circuit, field programmable gate array, any combination of the aforementioned devices, or other device that combines the functionality of the optimal power allocation method onto a single chip or multiple chips programmed to carry out the method steps described herein, or may be embodied in a general purpose computer having the appropriate peripherals attached thereto and a software product stored on a computer readable media that can be loaded into main memory and executed by a processing unit to carry out the functionality of the inventive apparatus and steps of the inventive method described herein.

As was illustrated above, the OPA-LSSTC for some structures can provide about a 2.5 dB gain over the existing EPA-LSSTC of the same structure. This gain has been provided with the only cost being the OPA processing at the BS, which is insignificant.

It is to be understood that the present invention is not limited to the embodiment described above, but encompasses any and all embodiments within the scope of the following claims.

We claim:

1. A computerized optimal power allocation method for an LSSTC wireless transmission system, comprising the steps of:

obtaining channel state information (CSI) and direction of arrival data (DOA) as feedback from a receiver of the LSSTC wireless transmission system;

formulating a power allocation (PA) vector $K=[K_1, K_2, \ldots, K_{M-1}]$, where $K_i$ is the ratio of transmit power of the $i^{th}$ layer to the sum of power of layers $i+1, \ldots, K$, $K_i$ being defined by the relation:

$$K_i = \frac{P_i}{\sum_{j=i+1}^{K} P_j}, i = 1, 2, \ldots, K-1,$$

where $P_i$ denotes the transmit power of the $i^{th}$ layer;

characterizing the optimum power allocation (OPA) processing by the power allocation (PA) vector, the PA formulation being based on the CSI and the DOA;

obtaining an average symbol error probability, $P_{av|(K,N_0)}$, from the LSSTC wireless transmission system; and numerically differentiating the average symbol error probability, $P_{av|(K,N_0)}$, with respect to an OPA pattern K, the OPA pattern K being derived from the power allocation vector and being characterized by a value of $K=[K_1, K_2, \ldots, K_{K-1}]$ satisfying a partial differential equation defined as $$\frac{\partial P_{av|(\kappa,N_0)}}{\partial K_i} = 0, i = 1, 2, \ldots, K-1.$$

2. The computerized optimal power allocation method according to claim 1, wherein the numerical differentiation step further comprises the steps of:

using an initial estimate of the PA pattern characterized by the equation $K^{(0)}=[K_1^{(0)}, K_2^{(0)}, \ldots, K_{K-1}^{(0)}]$ to solve the partial differential equation by Newton's method;

iterating through Newton's method until convergence, and thus a solution is obtained, convergence depending on the initial estimate $K^{(0)}$ and a step size used in the Newton's method.

3. An optimal power allocation system for LSSTC wireless transmissions, comprising:

means for obtaining channel state information (CSI) and direction of arrival data (DOA) as feedback from a receiver of an LSSTC wireless transmission system;

means for formulating a power allocation (PA) vector $K=[K_1, K_2, \ldots, K_{M-1}]$, where $K_i$ is the transmit power ratio of the $i^{th}$ layer to the sum of power of layers $i+1, \ldots, K$, $K_i$ being defined by the relation:

$$K_i = \frac{P_i}{\sum_{j=i+1}^{K} P_j}, i = 1, 2, \ldots, K-1,$$

where $P_i$ denotes the transmit power of the $i^{th}$ layer;

means for characterizing the optimum power allocation (OPA) processing by the power allocation (PA) vector, the PA formulation being based on the CSI and the DOA;

means for obtaining an average symbol error probability, $P_{av|(K,N_0)}$, from the LSSTC wireless transmission system; and means for numerically differentiating the average symbol error probability, $P_{av|(K,N_0)}$, with respect to an OPA pattern K, the OPA pattern K being derived from the power allocation vector and being characterized by a value of $K=[K_1, K_2, \ldots, K_{K-1}]$ satisfying a partial differential equation defined as:

$$\frac{\partial P_{av|(\kappa,N_0)}}{\partial K_i} = 0, i = 1, 2, \ldots, K-1.$$

4. The optimal power allocation system for LSSTC wireless transmissions according to claim 3, wherein the means for numerical differentiation further comprises:

means for utilizing an initial estimate of the PA pattern characterized by the equation $K^{(0)}=[K_1^{(0)}, K_2^{(0)}, \ldots, K_{K-1}^{(0)}]$ to solve the partial differential equation by Newton's method;

means for iterating through Newton's method until convergence, and thus a solution is obtained, the convergence depending on the initial estimate $K^{(0)}$ and a step size used in Newton's method.

5. A computer software product, comprising a non-transitory medium readable by a processor, the medium having stored thereon a set of instructions for establishing optimal power allocation for an LSSTC wireless transmission system, the set of instructions including: (a) a first sequence of instructions which, when executed by the processor, causes the processor to obtain channel state information (CSI) and direction of arrival data (DOA) as feedback from a receiver of the LSSTC wireless transmission system; (b) a second sequence of instructions which, when executed by the processor, causes the processor to formulate a power allocation (PA) vector $K=[K1, K2, \ldots, KM-1]$, where Ki is the transmit power ratio of the i.sup.th layer to the sum of power of layers $i+1, \ldots, K$, Ki being defined by the relation: Ki=Pi j=i+1 KPj, i=1, 2, K-1, where Pi denotes the transmit power of the i.sup.th layer, the PA formulation being based on the CSI and the DOA; (c) a third sequence of instructions which, when executed by the processor, causes the processor to characterize the optimum power allocation (OPA) processing by the power allocation (PA) vector; (d) a fourth sequence of instructions which, when executed by the processor, causes the processor to obtain an average symbol error probability, Pav|(K,N.sub.0.sub.), from the LSSTC wireless transmission system; and (e) a fifth sequence of instructions which, when executed by the processor, causes the processor to numerically differentiate the average symbol error probability, Pav|(K,N.sub.0.sub.), with respect to an OPA pattern K, the OPA pattern K being derived from the power allocation vector and being characterized by a value of $K=[K1, K2, \ldots, KK-1]$ satisfying a partial differential equation defined as .differential. P av |(.kappa., N0).differential. Ki=0, i=1, 2, K=1.

6. The computer software product according to claim 5, further comprising:

(f) a sixth sequence of instructions which, when executed by the processor, causes the processor to utilize an initial estimate of the PA pattern characterized by the equation $K^{(0)}=[K_1^{(0)}, K_2^{(0)}, \ldots, K_{K-1}^{(0)}]$ to solve the partial differential equation by Newton's method;

(g) a seventh sequence of instructions which, when executed by the processor, causes the processor to iterate through Newton's method until convergence, and thus obtain a solution, the convergence depending on the initial estimate $K^{(0)}$ and a step size used in Newton's method.

* * * * *